United States Patent
Yakovenko et al.

(10) Patent No.: US 10,328,900 B1
(45) Date of Patent: Jun. 25, 2019

(54) SYSTEM AND METHODS FOR VEHICLE PASSIVE KEYLESS ENTRY TRIGGERED BY SMARTPHONE PROXIMITY DETECTION

(71) Applicant: LEAR CORPORATION, Southfield, MI (US)

(72) Inventors: Nikolay Yakovenko, West Bloomfield, MI (US); Riad Ghabra, Northville, MI (US); Chadi Shaya, Macomb, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/830,504

(22) Filed: Dec. 4, 2017

(51) Int. Cl.
*B60R 25/24* (2013.01)

(52) U.S. Cl.
CPC ........ *B60R 25/24* (2013.01); *B60R 2325/101* (2013.01); *B60R 2325/205* (2013.01)

(58) Field of Classification Search
CPC .......................... B60R 25/24; B60R 2325/101
USPC .................................................. 340/5.6–5.65
See application file for complete search history.

(56) References Cited

U.S. PATENT DOCUMENTS

| | | | |
|---|---|---|---|
| 7,388,466 B2 | 6/2008 | Ghabra et al. | |
| 8,751,065 B1 | 6/2014 | Kato | |
| 2005/0190041 A1 | 9/2005 | Sahai | |
| 2007/0200672 A1 | 8/2007 | McBride et al. | |
| 2009/0096575 A1 | 4/2009 | Tieman | |
| 2009/0273438 A1 | 11/2009 | Sultan et al. | |
| 2012/0092129 A1 | 4/2012 | Lickfelt | |
| 2013/0079951 A1 | 3/2013 | Brickman | |
| 2014/0274013 A1 | 9/2014 | Santavicca | |
| 2014/0274223 A1* | 9/2014 | Kleve | H04W 52/0209 455/574 |
| 2015/0048927 A1 | 2/2015 | Simmons | |
| 2015/0109116 A1* | 4/2015 | Grimm | B60R 25/1001 340/426.18 |
| 2015/0161834 A1 | 6/2015 | Spahl et al. | |
| 2015/0235486 A1 | 8/2015 | Ellis et al. | |
| 2015/0363988 A1* | 12/2015 | Van Wiemeersch | H04M 1/11 455/557 |
| 2016/0099927 A1* | 4/2016 | Oz | H04L 63/08 726/9 |
| 2016/0375861 A1 | 12/2016 | Miyazawa | |
| 2017/0241188 A1* | 8/2017 | Kalhous | E05F 15/40 |
| 2017/0313262 A1* | 11/2017 | Wisnia | B60R 11/04 |
| 2017/0370132 A1* | 12/2017 | Da Deppo | B60R 25/01 |

* cited by examiner

*Primary Examiner* — Allen T Cao
(74) *Attorney, Agent, or Firm* — Brooks Kushman P.C.

(57) ABSTRACT

The current disclosure relates to unlocking at least one vehicle door or a trunk and operating other welcome features on the vehicle, including but not limited to, opening a tailgate, turning on ambient lights or head lights, and starting a vehicle engine. The current disclosure is directed to a system and method for automatically unlocking at least one door or a trunk on the vehicle using a smartphone and a vehicle key fob. Due to the method provided herein, frequent recharging of the vehicle key fob is not required, nor does the size of the key fob have to be large enough to hold large batteries.

20 Claims, 2 Drawing Sheets

SYSTEM AND METHODS FOR VEHICLE PASSIVE KEYLESS ENTRY TRIGGERED BY SMARTPHONE PROXIMITY DETECTION

TECHNICAL FIELD

Generally, the current disclosure relates to a system and method for unlocking doors for a vehicle. Particularly, the current disclosure relates to a system and method for using a key fob and a smartphone to unlock doors or a trunk for a vehicle.

BACKGROUND

Using a key fob system to lock or unlock vehicle doors is convenient for a driver because the driver does not have to use an actual key to lock or unlock the vehicle doors. Also, the key fob system allows the driver to lock or unlock a rear hatch or truck and to remotely initiate a vehicle engine. Furthermore, the key fob system can be used to alert the driver to locate his vehicle by alarming sound or turning lights on and off. To broaden the range of applications of such a key fob system, recent trends have been to add greater range, to give them bi-directional capacity, and to add a display to indicate vehicle information. Since these control functions requires more energy and power, the current trend is to make the key fob battery rechargeable or larger, heavier and more expensive.

SUMMARY

The system and method disclosed herein was developed to reduce consumption of battery power so that the key fob system can be kept as small as possible without requiring frequent recharging, while still maintaining the same function as required by today's car industry.

The current disclosure relates to unlocking or unlatching at least one vehicle door or a trunk and operating other welcome features on the vehicle, including but not limited to, opening a tailgate, turning on ambient lights or head lights, and starting the vehicle engine. The current disclosure is directed to a system and method for automatically unlocking at least one door or a trunk on the vehicle using a smartphone and vehicle key fob. Due to the method provide herein, the vehicle key fob is not required to be recharged frequently, or a size of the key fob does not have to be large enough to hold large batteries. In most situations, the key fob stays at low energy mode so that the key fob does not require large batteries or frequent recharging.

In one aspect, an embodiment of the present disclosure may provide a method comprising steps of: initiating wireless communication between a smartphone and a vehicle when the smartphone is within a first vehicle range; in response to initiating the wireless communication, transmitting a wake-up signal from the vehicle to a key fob to wake up the key fob when the key fob is within a second vehicle range; initiating an exchange with the key fob to measure a distance between the key fob and the vehicle in response to waking up the key fob; and operating a remote feature on the vehicle when the key fob is found within at least one predefined authorization zone or a pattern of sequential geometric locations describe the key fob approaching the vehicle.

In another aspect, an embodiment of the present disclosure may provide a method comprising steps of: establishing a wireless connection between a smartphone and a vehicle when a first distance between the smartphone and the vehicle is within a first pre-determined distance value; sending a wake-up signal to a key fob in wireless communication with the vehicle when a second distance between the smartphone and the vehicle is within a second pre-determined distance value; and activating a vehicle function within the vehicle when the key fob is found within at least one predefined authorization zone or a pattern of sequential geometric locations describe the key fob approaching the vehicle.

In another aspect, an embodiment of the present disclosure may provide a method for unlocking at least one door or a trunk or operating other welcome features on a vehicle, comprising steps of: initiating a wireless connection between a smartphone and the vehicle when the smartphone is within a communication range from the vehicle, wherein the wireless connection is used to track a distance between the smartphone and the vehicle; transmitting a wake-up signal from the vehicle to the key fob when the smartphone is within a second communication range from the vehicle, the second communication range being less than the first communication range; receiving ultra-wideband (UWB) signals from the key fob to determine a position of the key fob when the key fob is within the second communication range; and activating a remote feature on the vehicle when the key fob is within an authorization zone of the vehicle.

BRIEF DESCRIPTION OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the invention.

Similar numbers refer to similar parts throughout the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The current disclosure relates to a vehicle passive keyless entry system that is triggered by a smartphone proximity detection to remotely operate a vehicle locking and unlocking system or wake up other features on the vehicle. The distance between a vehicle and a user carrying both a smartphone and a key fob may be measured. The distance between the smartphone and the vehicle may be measure based on signal strength, time-of-flight (ToF), or acceleration sensors when the user approaches the vehicle and the smartphone becomes within the range of Wi-Fi or Bluetooth communication. A wakeup signal may be sent to the key fob to activate distance tracking between the key fob and the vehicle when the person walks closer to the vehicle. As the user becomes within the range of accurate low frequency (LF) or ultra-wide band (UWB) ToF distance determination between the key fob and a base station, the location of the key fob is determined to be suitable for door unlock. These aspects and others will be described in more detail below.

Figure 1:
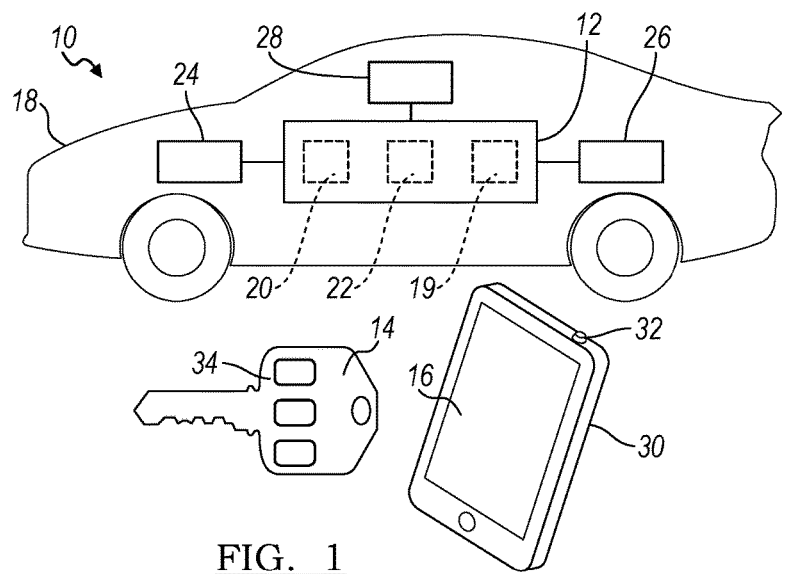
FIG. 1 is in accordance with the present disclosure showing a system for unlocking at least one door or a trunk or operating welcome features on a vehicle.

As depicted in FIG. 1, a passive vehicle entry system 10 may comprise a vehicle communication system 12, a vehicle key fob 14 and a smartphone 16. The vehicle communication system 12 may include a tele-communication device which has capability of transmitting and/or receiving signals through Wi-Fi, Bluetooth, 2G, 3G, or LTE etc. The communication system 12 may be located inside of a vehicle 18. In one embodiment, the communication system 12 may include at least one receiver 19, at least one transmitter 20, and at least one controller 22. In another embodiment, the receiver 19 and the transmitter 20 can be replaced by a transceiver (not shown) which can receive and transmit signals. The vehicle communication system 12 may be connected to an unlocking device 24 of the vehicle 18 to open at least one vehicle door. The communication system 12 can be further connected to a remote start device 26 to start an engine or and an alarming device 28 to make alerting sound. In another embodiment, it is understood that the communication system 12 can be located outside of the vehicle 18 and can be controlled by a remote controller (not shown in FIG. 1).

As depicted in FIG. 1, the smartphone 16 may include a communication device 30 and a proximity sensor 32. The communication device 30 may allow the smartphone 16 to be wirelessly connected to the vehicle 18 using any communication method, including but not limited to Wi-Fi, Bluetooth, 2G, 3G, or LTE so that the vehicle 18 is in electrical communication with the smartphone 16 once the smartphone 16 is located within a vehicle communication range. A typical vehicle communication range using Wi-Fi or Bluetooth between the vehicle 18 and the smartphone 16 may be from about 10 to about 30 meters. However, in another embodiment, the vehicle communication range may be less than about 10 meters or more than about 30 meters. The vehicle key fob 14 may include a communication device 34, which allows connection with the vehicle 18 to transmit and/or receive signals back and forth. In this embodiment, the smartphone 16 may not be in direct communication with the vehicle key fob 14. However, in another embodiment, the smartphone 16 can be in direct communication with the vehicle key fob 14 so that the smartphone 16 and the key fob 14 can transmit and/or receive signals back and forth.

Figure 2:
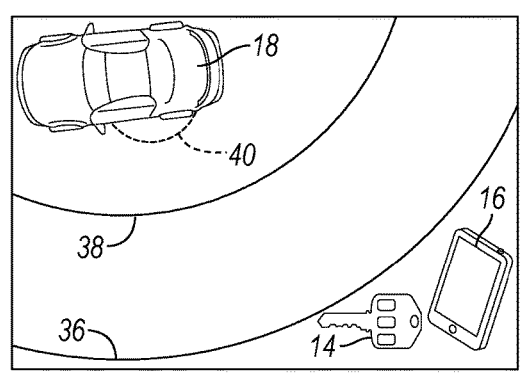
FIG. 2 is an exemplary schematic view of the vehicle door unlocking system showing that a smartphone and a vehicle key fob is located outside of a first vehicle communication range.
Figure 5:
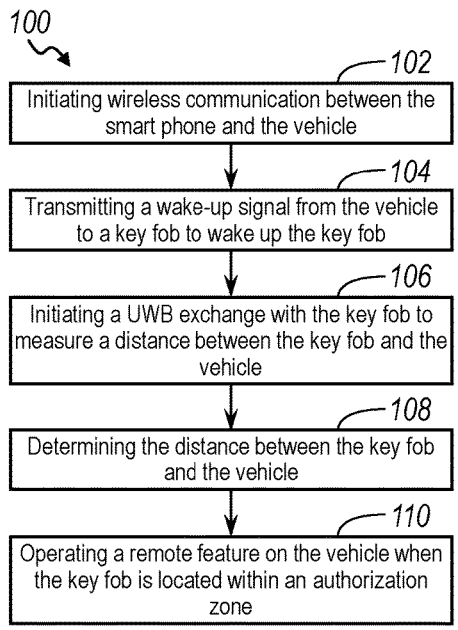
FIG. 5 is a first block diagram to implement a proposed method for unlocking a vehicle door and operating other welcome features on the vehicle.

As depicted in FIGS. 2 and 5, a process of unlocking a least one vehicle door or a trunk using the passive vehicle entry system 10 is illustrated. As shown in FIG. 2, initially, a user (not shown in FIG. 2) holding the smartphone 16 and the vehicle key fob 14 may be located outside of a first vehicle communication range 36 and a second vehicle communication range 38. The first vehicle communication range 36 may be defined where the smartphone 16 is in wireless communication with the vehicle 18 to transmit and/or receive signals or information back and forth. Furthermore, the second vehicle communication range 38 may be defined where the vehicle key fob 14 is in wireless communication with the vehicle 18 to transmit and/or receive signals or information back and forth. The first vehicle communication range 36 may be greater than the second vehicle communication range 38.

Figure 3:
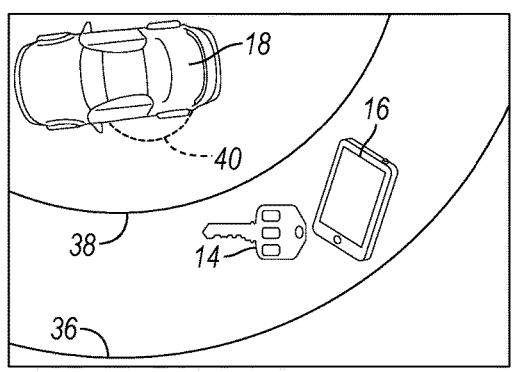
FIG. 3 is an exemplary schematic view of the vehicle door unlocking system showing that the smartphone and key fob is located inside of the first vehicle communication range but outside of a second vehicle communication range.

As shown in FIG. 3, as the user (not shown) holding the smartphone 16 and the vehicle key fob 14 approaches the first vehicle communication range 36, the proximity sensor 32 on the smartphone 16 may detect the distance between the smartphone 16 and the vehicle 18. If the distance between the smartphone 16 and the vehicle 18 is within the first vehicle communication range 36, then the vehicle 18 and the smartphone 16 may initiate communication to share the distance information between the vehicle 18 and the smartphone 16. The distance information between the vehicle 18 and the smartphone 16 may be carried by either Wi-Fi or Bluetooth connection. In another embodiment, the distance information can be carried by any other existing tele-communication means. Once Wi-Fi or Bluetooth connection is established, the smartphone 16 may start processing Time-of-Flight (ToF) of radio wave measurement, triangulation, trilateration, and/or Received Signal Strength Indicator (RSSI) to determine distance between the smartphone 16 and the vehicle 18. In another embodiment, the vehicle 18 may start processing Time-of-Flight of radio wave measurement, triangulation, trilateration, and/or Received Signal Strength Indicator to determine distance between the smartphone 16 and the vehicle 18.

Time-of-Flight (ToF) is a property of an object, particle or acoustic, electromagnetic or another wave. It refers to the time that such an object needs to travel a distance through a medium. Tracking ToF of a known signal between two sources, therefore, can be used to determine the distance between those sources. According to one or more embodiments of the present disclosure, distance tracking between the smartphone 16 (or key fob 14) and the vehicle 18 may be accomplished by applying ToF to ultra-wideband (UWB) signals, Wi-Fi signals, global positioning system (GPS) signals, or the like.

With the advent of multiple vehicle antennas (e.g., multiple Wi-Fi antennas), it is possible to estimate the angle of arrival of the multipath signals received at the antenna arrays, and apply triangulation or trilateration to calculate the location of a devices, such as a smartphone or a key fob. The triangulation or trilateration technique using Wi-Fi or UWB signals may be employed to track the position of the smartphone 16 (or key fob 14) against the vehicle 18, according to one or more embodiments of the present disclosure.

RSSI is a measurement of the power present in a received radio signal. RSSI localization techniques are based on measuring signal strength from a client device to several different access points, and then combining this information with a propagation model to determine the distance between the client device and the access points. According to one or more embodiments, RSSI may be employed either alone or in combination with other distance tracking techniques to determine the location of the smartphone 16 (or key fob 14) in relation to the vehicle 18

Figure 4:
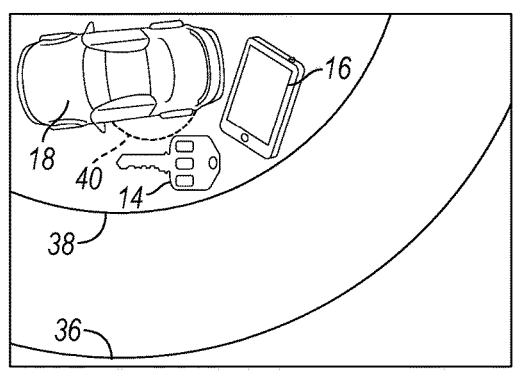
FIG. 4 is an exemplary schematic view of the vehicle door unlocking system showing that both the smartphone and the key fob are located inside of the second vehicle communication range.

As depicted in FIG. 4, the user (not shown) holding the smartphone 16 and the vehicle key fob 14 may continue approaching the vehicle 18 and cross within the second vehicle communication range 38. Once the distance between the vehicle 18 and the smartphone 16 becomes within, e.g., 2 to 3 meters, a vehicle key fob wakeup process may be initiated by the vehicle communication system 12 utilizing either Low Frequency (LF), Ultra High Frequency (UHF), or Super High Frequency (SHF) communication so that the vehicle key fob 14 is electrically ready to transmit signals to the vehicle 18 or receive signals from the vehicle 18. In another embodiment, the vehicle key fob wakeup process can be initiated as the distance between the vehicle 18 and the smartphone 16 is less than 2 meters or greater than 3 meters. This process may be determined by predicted possibility of wakeup (i.e. wakeup signal believed to be reaching the key fob) and predicted possibility that the vehicle key fob 14 will be able to call the vehicle 18 reliably and continuously. The LF, UHF or SHF communication of the vehicle key fob wakeup process is typical for passive entry systems that can "wake up" the vehicle key fob 14 from ultra-low power mode, where the vehicle side may introduce the pulses with high enough power to be able to produce high enough level of power to energize otherwise depowered circuits of the vehicle key fob 14.

Once awake, the key fob 14 will continue communication to the vehicle 18 for distance measurement using either LF communication, UWB communication, or both. The nature of distance measurement using LF communication is different from UWB communication. LF distance measurement communication uses RSSI, while UWB distance measurement communication relies on ToF. LF uses more energy to transmit than to receive. Therefore, the vehicle 18 may initiate LF distance measurement communication between the vehicle and the key fob 14. UWB communication uses less energy than LF communication. Accordingly, the key fob 14 may initiate UWB distance measurement communication with the vehicle 18. Distance measurement requires an exchange of signals between the key fob and the vehicle. Due to specific properties of LF or UWB distance measurement communication, the distance between the antennas of the vehicle key fob 14 and the antennas of the vehicle 18 can be determined reliably with the accuracy of up to 2.5 centimeters, helping determine whether the key fob 14 is located within the boundary of a predefined authorization zone 40.

Figure 6:
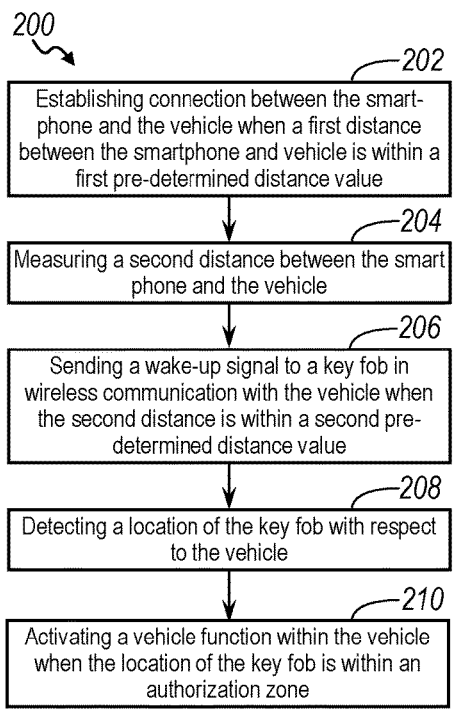
FIG. 6 is a second block diagram to implement a proposed method for unlocking a vehicle door and operating other welcome features on the vehicle.
Figure 7:
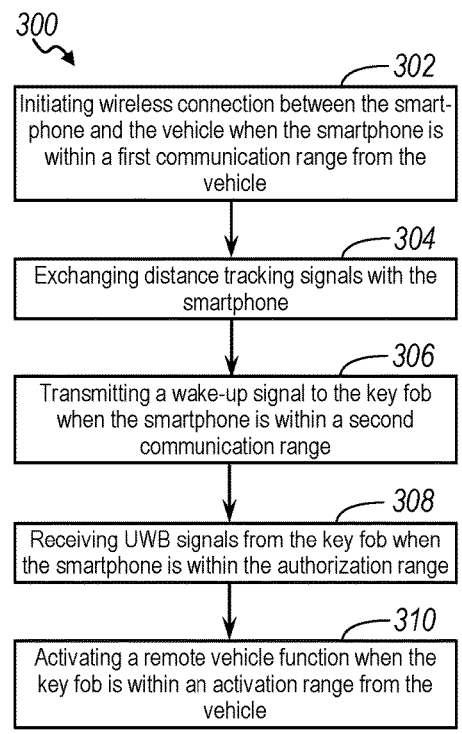
FIG. 7 is a third block diagram to implement a proposed method for unlocking a vehicle door and operating other welcome features on the vehicle.

FIGS. 5-7 show various flow charts depicting methods in accordance with various embodiments of the present disclosure. As depicted in FIG. 5, a first method 100 to implement the proposed communication with a vehicle using a vehicle key fob and a smartphone is provided. At a step 102, wireless communication may be initiated between the smartphone 16 and the vehicle 18 when the smartphone is located within a first vehicle range. The first vehicle range may be defined as a distance between the smartphone 16 and the vehicle 18 where the smartphone 16 and the vehicle 18 can wirelessly communicate using Wi-Fi, Bluetooth, or the like. Initiating wireless communication with the smartphone 16 may involve the vehicle determining whether the smartphone 16 is located within the first vehicle range. In an embodiment, the smartphone 16 may transmit a wireless communication signal (e.g., Wi-Fi, Bluetooth, etc.) that can be picked up by the receiver 19 indicating the smartphone 16 is within the first vehicle range. In another embodiment, the vehicle 18 may transmit a wireless communication signal (e.g., Wi-Fi, Bluetooth, etc.) via the transmitter 20 that can be picked up by the smartphone 16 when the smartphone 16 is within the first vehicle range. The receiver 19 may then receive a confirmation signal from the smartphone 16 confirming to the vehicle 18 that the smartphone 16 is within the first vehicle range. In an embodiment, the first vehicle range me be about 10-30 meters.

Initiating wireless communication between the smartphone 16 and the vehicle 18 may trigger the vehicle 18 to begin transmitting a wake-up signal for the key fob 14, as provided at step 104. Accordingly, the vehicle 18 may transmit a wake-up signal to the vehicle key fob 14 to wake up the key fob 14 when it is within a second vehicle range. The second vehicle range may be defined as a distance between the key fob 14 and the vehicle 18 where the key fob can successfully receive the wake-up signal and transition from a low energy mode to a normal energy mode to be ready to communicate with the vehicle 18. In an embodiment, the second vehicle range may be about 2-3 meters. The wake-up signal may be a low-frequency signal. To this end, the transmitter 20 may transmit a low-frequency signal capable of activating the key fob 14 when it is within the second vehicle range. Alternatively, the wake-up signal to the key fob 14 from the vehicle 18 may be a UHF or SHF signal.

Waking up the key fob 14 may activate a UWB circuit or transmitter (not shown) in the key fob 14 for exchanging UWB signals with the vehicle 18 to track the distance therebetween and locate the key fob with respect to the vehicle. Accordingly, at a step 106, a UWB exchange may be initiated between the key fob 14 and the vehicle 18 to measure a distance between the key fob and the vehicle in response to waking up the key fob. The UWB exchange may at least include receiving at the vehicle 18 a first UWB signal from the key fob 14 to initiate distance tracking, transmitting from the vehicle 18 a second UWB signal to the key fob 14, and receiving at the vehicle 18 a third UWB signal from the key fob 14 in response to the second UWB signal. The vehicle 18 may determine the distance between the key fob 14 and the vehicle 18 by applying time-of-flight (ToF) measurement of the UWB signals being exchanged, as provided at step 108. In another embodiment, distance or location tracking of the key fob 14 with respect to the vehicle may be accomplished using Wi-Fi or UWB triangulation or trilateration.

At a step 110, when it is determined that the key fob 14 is located within one or more predefined authorization zones around the vehicle 18, a remote feature on the vehicle may be operated. For example, the vehicle 18 may automatically unlock at least one door or a trunk if it detects the key fob 14 within an authorization zone. A predefined authorization zone may be a predetermined three-dimensional geometric space or zone. Other remote features on the vehicle 18 that may be operated include opening a tail gate, opening a door, turning on ambient lights or head lights, or starting an engine. A particular remote feature may be operated when the key fob 14 is within a particular predefined authorization zone. For example, a predefined authorization zone may be assigned to the front left door of the vehicle. Accordingly, the vehicle may unlock the front left door of the vehicle 18 when the key fob 14 is located within the front left door zone. In an embodiment, a predefined authorization zone may be located from 0 to 1.5 meters from an external surface of the vehicle. In another embodiment, a predefined authorization zone can include space greater than 1.5 meters from the vehicle's external surface.

Alternatively, the vehicle 18 may operate a remote feature when a pattern of sequential geometric locations describes the key fob 14 approaching the vehicle. For instance, the vehicle may open a door when the vehicle detects a key fob 14 approaching the vehicle from behind based on the pattern of sequential geometric locations. However, the vehicle may be reluctant to open a door when it detects the key fob 14 is approaching the vehicle from the front in order to prevent a user from striking the door or being hit by the door itself.

As depicted in FIG. 6, a second method 200 to implement the proposed communication with a vehicle using a vehicle key fob and a smartphone is provided. The key fob 14 and the smartphone 16 may be remotely located from the vehicle 18. Moreover, all doors or a trunk of the vehicle 18 may already be locked, and other features on the vehicle 18 such as welcoming features (i.e., ambient lights or head lights etc.) may already be turned off. At a step 202, a wireless connection between the smartphone 16 and the vehicle 18 may be established. For instance, the wireless connection may be established when a first distance between the smartphone and the vehicle is within a first pre-determined distance value. The first pre-determined distance value may be defined as a distance between the smartphone 16 and the vehicle 18 where the smartphone 16 and the vehicle 18 can wirelessly communicate using Wi-Fi, Bluetooth, or the like. Establishing a wireless connection with the smartphone 16 may involve the vehicle determining whether the smartphone 16 is located within the first pre-determined distance value. In an embodiment, the smartphone 16 may transmit a wireless communication signal (e.g., Wi-Fi, Bluetooth, etc.) that can be picked up by the receiver 19 indicating the smartphone 16 is within the first pre-determined distance value. In another embodiment, the vehicle 18 may transmit a wireless communication signal (e.g., Wi-Fi, Bluetooth, etc.) via the transmitter 20 that can be picked up by the smartphone 16 when the smartphone 16 is within the first pre-determined distance value. The receiver 19 may then receive a confirmation signal from the smartphone 16 confirming to the vehicle 18 that the smartphone 16 is within the first pre-determined distance value.

Additionally, or alternatively, the first distance between the vehicle 18 and the smartphone 16 may be measured. In this step, a user/driver holding the smartphone 16 and the vehicle key fob 14 may approach the vehicle 18. As the driver/user holding the smartphone 16 and the vehicle key fob 14 approaches the vehicle 18, the proximity sensor 32 on the smartphone 16 may detect proximity to the vehicle 18 and establish the wireless connection to the vehicle when the first distance is within the pre-determined distance value. In one embodiment, the first pre-determined distance value may be from about 10 to about 30 meters. However, in another embodiment, the first pre-determined distance can be less than 10 meters and greater than 30 meters. At the step 202, if the first distance is within the first pre-determined distance value (i.e, from 10 to 30 meters), then the vehicle 18 and the smartphone 16 may initiate electrical telecommunication (i.e., wireless connection) between them. For instance, the vehicle 18 may communicate with the smartphone via its receiver 19 and transmitter 20 (which may be combined to form a transceiver). The tele-communication may be established using Bluetooth or Wi-Fi connection. However, in another embodiment, the tele-connection between the vehicle 18 and the smartphone 16 can be established using any other tele-communication methods.

At a step 204, a second distance between the vehicle 18 and the smartphone 16 may be measured to determine whether the second distance between the vehicle 18 and the smartphone 16 is within a second pre-determined distance value. In one embodiment, the second pre-determined distance value may be about 3 meters. In another embodiment, the second pre-determined distance value can be less or greater than 3 meters. At the step 204, measuring the second distance between the smartphone 16 and the vehicle 18 may be accomplished by applying ToF using GPS, Wi-Fi or UWB and/or Received Signal Strengthen Indicator (RSSI) between the smartphone 16 and the vehicle 18. Alternatively, measuring the second distance between the smartphone 16 and the vehicle 18 may be accomplished by applying Wi-Fi or UWB triangulation or trilateration. At a step 206, if the second distance between the vehicle 18 and the smartphone 16 is less than the second pre-determined distance value (i.e. 3 meters), the vehicle 18 may transmit a wake-up signal to the vehicle key fob 14 held by the driver/user to activate the vehicle key fob 14 to be ready for communication with the vehicle 18. Activating the key fob 14 may be accomplished by triggering a wakeup request (e.g., either LF, UHF, or SHF). Waking up the key fob 14 may activate, for example, an ultra-wideband (UWB) circuit or transmitter (not shown) in the key fob 14 for exchanging UWB signals with the vehicle 18 to track the distance therebetween and locate the key fob with respect to the vehicle.

At a step 208, a location of the key fob 14 with respect to an authorization zone, defined by a distance between the key fob 14 and the vehicle 18, may be measured or otherwise detected. The location of the key fob 14 around the vehicle 18 may be measured by applying ToF using GPS, Wi-Fi, UWB, or the like. As previously described, a UWB exchange may be initiated between the key fob 14 and the vehicle 18 to determine an orientation or location of the key fob against the vehicle using ToF of the radio signal between the key fob and one or more vehicle antennas. When the key fob 14 is located within an appropriate predefined authorization zone, the vehicle 18 may activate a function within the vehicle (e.g., unlock at least one door for the vehicle 18, unlatch a trunk of the vehicle 18, or the like), as provided at a step 210. In an embodiment, the authorization zone may be approximately defined as a 1.5-meter radius around a particular vehicle door or tailgate. The authorization zone may have a three-dimensional spherical or cubic shaped attached to a left, right, and/or rear side of the vehicle 18. In addition to unlocking a vehicle door or unlatching a trunk, the vehicle function invoked may include other welcome features such as opening a tailgate, turning on ambient lights or head lights, or starting an engine for the vehicle 18.

As depicted in FIG. 7, a third method 300 to implement the proposed communication with a vehicle using a vehicle key fob and a smartphone is provided. The smartphone 16 and the vehicle key fob 14 may be initially located out of a first communication range from the vehicle 18. A driver/user who holds the smartphone 16 and the vehicle key fob 14 may bring the smartphone 16 and the vehicle key fob 14 within the first communication range with the vehicle 18. Accordingly, at step 302, a wireless connection between the smartphone 16 and the vehicle 18 may be initiated. For instance, the wireless connection may be initiated when the smartphone 16 is within the first communication range of the vehicle 18. The first communication range may be defined as a distance between the smartphone 16 and the vehicle 18 where the smartphone 16 and the vehicle 18 can wirelessly communicate using Wi-Fi, Bluetooth, or the like. Initiating a wireless connection with the smartphone 16 may involve the vehicle 18 determining whether the smartphone 16 is located within the first communication range. In an embodiment, the smartphone 16 may transmit a wireless communication signal (e.g., Wi-Fi, Bluetooth, etc.) that can be picked up by the receiver 19 indicating the smartphone 16 is within the first communication range. In another embodiment, the vehicle 18 may transmit a wireless communication signal (e.g., Wi-Fi, Bluetooth, etc.) via the transmitter 20 that can be picked up by the smartphone 16 when the smartphone 16 is within the first communication range. The receiver 19 may then receive a confirmation signal from the smartphone 16 confirming to the vehicle 18 that the smartphone 16 is within the first communication range. In one embodiment, the first communication range between the smartphone 16 and the vehicle 18 may be less than about 30 meters. In another embodiment, the first communication range can be less than less than about 20 meters. In yet another embodiment, the first communication range can be less than about 10 meters.

Distance tracking may be employed by virtue of the wireless connection between the smartphone 16 and the vehicle 18 to track the distance between the smartphone and the vehicle. Accordingly, at a step 304, the vehicle 18 may exchange distance tracking signals with the smartphone 16. The distance tracking may be accomplished by ToF (using GPS, Wi-Fi, UWB, or the like), trilateration or triangulation (using UWB or Wi-Fi). As a driver/user holding the smartphone 16 and the vehicle key fob 14 continues to approach the vehicle 18, the driver/user may bring the smartphone 16 and the vehicle key fob 14 within a second communication range of the vehicle 18. The second communication range may be less than the first communication range. In one embodiment, the second communication range may be about 3 meters. In another embodiment, the second communication range can be less than or greater than 3 meters. At a step 306, once it is determined that the smartphone 16 is located within the second communication range of the vehicle 18, the vehicle may transmit a wake-up signal to the key fob 14 to wake up the key fob from a sleep state to an active state. At the step 306, the wake-up signal to the key fob may be accomplished by wirelessly transmitting a short-range (low frequency) signal from the vehicle 18. In response to waking up, the key fob 14 may begin transmitting UWB signals to the vehicle 18

At step 308, the vehicle 18 may receive the UWB signals from the key fob 14 once it is determined that the smartphone 16 is located within the second communication range of the vehicle 18. Accordingly, a UWB exchange may be initiated between the key fob 14 and the vehicle 18 to track the distance between the key fob and the vehicle. At a step 310, the vehicle 18 may activate a remote vehicle function when the key fob 14 is within an authorization zone of the vehicle 18. In an embodiment, the authorization zone may be approximately defined as a 1.5-meter radius around a particular vehicle door or tailgate. The authorization zone may have a three-dimensional spherical or cubic shaped attached to a left, right, and/or rear side of the vehicle 18. In another embodiment, the authorization zone may be less than or greater than 1.5 meters. The remote vehicle function may include unlocking at least one door or trunk on the vehicle 18, opening a tailgate, turning on at least one light, or starting an engine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   initiating wireless communication between a smartphone and a vehicle when the smartphone is within a first vehicle range;
   in response to initiating the wireless communication, transmitting a wake-up signal from the vehicle to a key fob to wake up the key fob when the key fob is within a second vehicle range;
   initiating an exchange with the key fob to measure a distance between the key fob and the vehicle in response to waking up the key fob; and
   operating a remote feature on the vehicle in response to the key fob being located within a predefined authorization zone.

2. The method of claim 1, wherein wireless communication is initiated by sending a signal from the vehicle to the smartphone or requesting a signal from the smartphone to the vehicle.

3. The method of claim 1, wherein the wake-up signal is a low-frequency (LF) polling signal.

4. The method of claim 1, wherein the wake-up signal is an ultra high-frequency (UHF) or super high frequency (SHF) signal.

5. The method of claim 1, wherein initiating an exchange with the key fob to measure a distance between the key fob and the vehicle comprises initiating an ultra-wideband (UWB) exchange with the key fob to measure the distance between the key fob and the vehicle using time-of-flight (ToF).

6. The method of claim 1, wherein the first vehicle range is from about 10 to about 30 meters.

7. The method of claim 1, wherein the second vehicle range is from about 2 to about 3 meters.

8. The method of claim 1, wherein operating a remote feature on the vehicle comprises:
   unlocking at least one door or a trunk of the vehicle.

9. The method of claim 1, wherein the wireless communication between the smartphone and the vehicle is established by Bluetooth or Wi-Fi connection.

10. A method comprising:
    establishing a wireless connection between a smartphone and a vehicle when a first distance between the smartphone and the vehicle is within a first pre-determined distance value;
    sending a wake-up signal to a key fob in wireless communication with the vehicle when a second distance between the smartphone and the vehicle is within a second pre-determined distance value; and
    activating a vehicle function within the vehicle when the key fob is located within a predefined authorization zone.

11. The method of claim 10, wherein the wireless connection between the smartphone and the vehicle is established by Bluetooth or Wi-Fi connection.

12. The method of claim 10, wherein the first distance between the smartphone and the vehicle is determined by detecting the proximity from the smartphone to the vehicle using a proximity sensor on the smartphone.

13. The method of claim 10, wherein the second distance between the smartphone and the vehicle is determined by applying a time-of-flight (ToF) of radio wave measurement between the smartphone and the vehicle.

14. The method of claim 13, wherein the ToF of radio wave measurement is applied using ultra-wideband (UWB) signals.

15. The method of claim 13, wherein the ToF of radio wave measurement is applied using Wi-Fi signals.

16. The method of claim 10, wherein the wake-up signal is a low-frequency (LF) polling signal.

17. The method of claim 10, wherein the location of the key fob within the predefined authorization zone is determined by applying a time-of-flight (ToF) of radio wave measurement between the key fob and the vehicle using ultra-wideband (UWB) signals.

18. A method comprising:
   initiating a wireless connection between a smartphone and a vehicle when the smartphone is within a first communication range from the vehicle, wherein the wireless connection is used to track a distance between the smartphone and the vehicle;
   transmitting a wake-up signal to a key fob when the smartphone is within a second communication range from the vehicle, the second communication range being less than the first communication range; and
   receiving ultra-wideband (UWB) signals from the key fob to determine a position of the key fob when the key fob is within the second communication range.

19. The method of claim 18, further comprising:
   activating a remote feature on the vehicle when the key fob is within an authorization zone of the vehicle.

20. The method of claim 19, wherein activating a remote feature on the vehicle comprises unlocking at least one vehicle door or a trunk on the vehicle.

* * * * *